United States Patent [19]
Howlett

[11] Patent Number: 5,388,756
[45] Date of Patent: Feb. 14, 1995

[54] METHOD AND APPARATUS FOR REMOVING CONTAMINANTS FROM SOLDER

[75] Inventor: Ronald E. Howlett, Richmond, Va.

[73] Assignee: AT&T Corp., Murray Hill, N.J.

[21] Appl. No.: 173,012

[22] Filed: Dec. 27, 1993

[51] Int. Cl.⁶ .......................... C22B 9/02; B23K 3/06
[52] U.S. Cl. .................................. 228/214; 228/56.2; 75/407; 266/229
[58] Field of Search ...................... 228/56.2, 56.1, 214; 210/521; 266/229; 75/407, 411

[56] References Cited

U.S. PATENT DOCUMENTS

| | | | |
|---|---|---|---|
| 4,892,653 | 1/1990 | Latge | 210/521 |
| 5,110,036 | 5/1992 | Parker, Jr. | 228/256 |
| 5,176,742 | 1/1993 | Zabala et al. | 75/407 |

FOREIGN PATENT DOCUMENTS

| | | | |
|---|---|---|---|
| 64-75153 | 3/1989 | Japan | 266/229 |
| 1168826 | 4/1989 | Japan | 226/229 |

OTHER PUBLICATIONS

Abstract of JA 1-168826 (Jul. 1989), Derwent Publications Ltd., London, England, 1989.

Primary Examiner—Kurt Rowan
Assistant Examiner—Jeffrey T. Knapp
Attorney, Agent, or Firm—Lester H. Birnbaum

[57] ABSTRACT

A method and apparatus allow for continuous removal of contaminants from solder. The solder is pumped from a main solder pot to an auxiliary solder pot through a skimmer valve which is heated to keep the solder molten. In the auxiliary pot, the solder is cooled so that dissolved contaminants such as copper precipitate out and are removed from the pot. The purified solder is then returned to the main pot, for example, by a gravity feed.

15 Claims, 2 Drawing Sheets

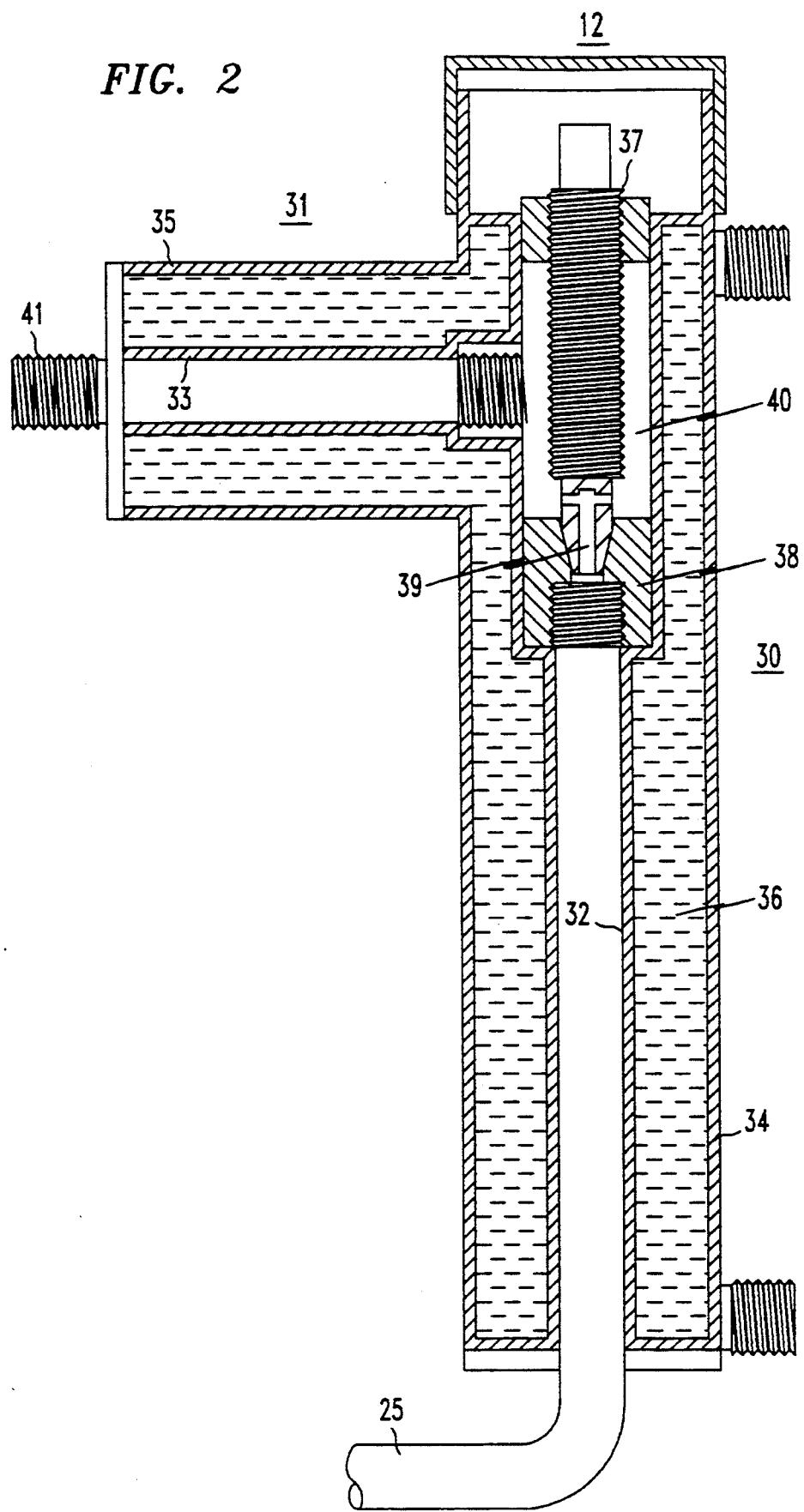

METHOD AND APPARATUS FOR REMOVING CONTAMINANTS FROM SOLDER

BACKGROUND OF THE INVENTION

This invention relates to soldering of electronic components and, in particular, to a method and apparatus for removal of contaminants from the solder during the solder operation.

In a typical printed circuit board fabrication process, the boards are coated with a solder mask which leaves exposed the copper contact pads and plated through-holes to be soldered. The boards are then dipped vertically in, or transferred horizontally through, molten solder and, upon removal from the solder pot, the excess solder is discharged by directing jets of air at the board in a procedure generally referred to in the art as Hot Air Solder Leveling (HASL). (See, e.g., U.S. Pat. No. 5,110,036 issued to Parker.)

As circuit boards are dipped into the solder pot, the solder, which is typically lead-tin, becomes contaminated with dissolved copper from the pads on the boards. When the contamination reaches a certain level (typically 0.3 percent), some solder is removed and replaced by fresh solder to lower the contamination level (usually to about 0.2 percent). The removed solder is usually returned to the solder supplier for recycling.

This approach is fairly expensive since the removed solder is classified as a hazardous waste and the recycle fee is high (currently $1.02 per pound). In addition, process downtime is required to remove the contaminated solder and melt the fresh solder.

One recent proposal involves a continuous removal of copper from solder. (See Japanese Patent 1-168826.) An auxiliary pot is provided with a pump and is connected to the main solder pot by means of pipes. The solder is drained out of the main pot and, while flowing in the auxiliary pot, is cooled in order to precipitate the copper. The purified solder is then pumped back into the main pot.

While generally useful, this approach has certain disadvantages. For example, if the solder level drops in the main pot as often occurs in the HASL process whenever the main solder pump is started and at other times, the solder could stop flowing in the auxiliary pot. Also, the maximum depth of solder in the auxiliary pot is limited to that of the main pot thereby increasing the space required for the auxiliary pot. Further, this scheme requires a pump in the auxiliary pot in addition to the standard pump in the main pot.

SUMMARY OF THE INVENTION

In accordance with one aspect, the invention is a method for continuous removal of contaminants from molten solder in a main solder pot. The solder is pumped to a valve assembly which directs the solder into an auxiliary solder pot. The valve assembly is heated to keep the solder in a molten condition. The solder is circulated in the auxiliary pot by a gravity feed while heating the auxiliary pot to a lesser temperature than the main pot which causes at least a portion of the contaminants to precipitate out of the solder. The solder is returned to the main pot after the portion of contaminants is removed.

In accordance with another aspect, the invention is an apparatus for continuous removal of contaminants from molten solder in a main solder pot. The apparatus includes an auxiliary pot for receiving the solder from the main pot, and a valve assembly for receiving the contaminated solder from the main pot and directing it into the auxiliary pot. The valve assembly includes means for heating the solder as it passes through the valve assembly. The auxiliary pot includes means for heating the solder at a lower temperature than solder in the main solder pot so as to precipitate at least a portion of the contaminants, and means for returning the solder to the main pot.

BRIEF DESCRIPTION OF THE DRAWING

These and other features of the invention are delineated in detail in the following description.

In the drawing:

FIG. 2 is an enlarged cross-sectional view of a portion of the apparatus of FIG. 1.

Figure 1:
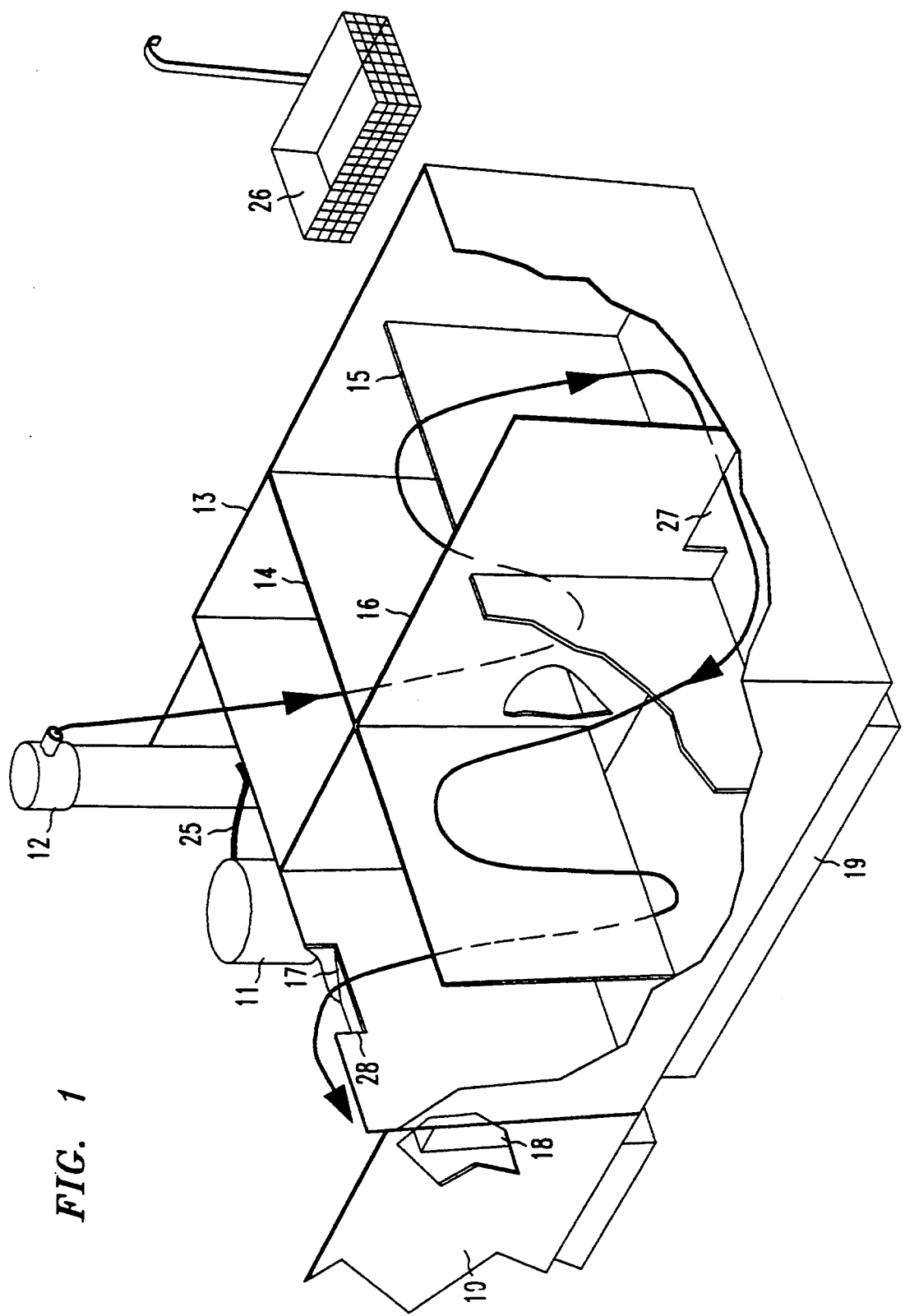
FIG. 1 is a perspective view of an apparatus in accordance with an embodiment of the invention.

It will be appreciated that for purposes of illustration, these figures are not necessarily drawn to scale.

DETAILED DESCRIPTION

The overall apparatus is best understood from the perspective view of FIG. 1.

Normal soldering takes place in the main solder pot 10, where a standard solder such as lead-tin is contained. In one particular example, the soldering performed is a Hot Air Solder Leveling (HASL) of printed circuit boards (not shown) which are transferred horizontally by rollers (not shown) through the main solder pot. Included within the main solder pot 10 as part of a standard HASL operation is a solder pump, 11, which pumps the solder in a vertical direction in order to fill the area between rollers to cover the boards as they travel through.

A skimmer valve, 12, has a hose, 25, coupled to the pump 11 to receive a portion of the solder which is pumped by the pump 11. An opposite end of the valve 12 is mounted to a side wall above the solder level in an auxiliary solder pot 13 which is adjacent to the main solder pot 10. Positioned in pot 13 essentially parallel to the adjacent sides of the pots are two weirs, 14 and 15, and positioned essentially perpendicular thereto at approximately the center of the pot 13 is a further weir 16. It should be understood that a "weir" in the context of this application is any structure which solder flows over or under in order to gain entry into a compartment or another pot. In this example, weirs 14, 15 and 16 are plates.

An overflow weir, 17, (i.e., spout) is also provided at an opening 28 in the surface of the pot 13 which is adjacent to the pot 10.

Weir 15 is mounted to the bottom of pot 13 and extends up to some distance (typically 15-18 cm) and stops below opening 28 (typically 2.5-5 cm below). Weirs 14 and 16 are mounted to the sides of pot 13 and extend above the level of opening 28 (typically about 2.5 cm above the opening and 2.5 cm below the top of the pot) and weir 14 extends to some distance above the bottom of the tank (typically 2.5-5 cm). Weir 16 extends to the bottom of the pot, but includes an opening 27 in the bottom of the weir at the end removed from the main pot.

The main solder pot 10 includes heaters, e.g., 18, on the bottom and sides, including the side adjacent to the auxiliary solder pot 13. The auxiliary solder pot 13 includes heaters, e.g., 19, on the bottom surface as well as heaters (not shown) on at least three sides. These heaters are typically of the low wattage electric type. Thermowells (not shown) extend from the side heaters into the solder pot 13 in order to allow thermocouples positioned therein to measure solder temperature. Typically, the heaters will keep the solder in the auxiliary solder pot at a temperature in the range 192–198 degrees C. while the solder in the main pot is held at 240–265 degrees C.

The valve assembly 12 is shown in greater detail in the cross-sectional view of FIG. 2. The assembly includes an essentially vertical portion 30 and an essentially horizontal portion 31. Both portions include pipes 32 and 33 which define passageways for the movement of solder therethrough. The pipes are encased in housings 34 and 35 which are filled with a material, 36, such as a glycol oil which acts as a heat transfer medium.

Mounted within the vertical portion 32 is a valve plug 37 with one end nestled in a seat 38 mounted at the top of pipe 32. The valve plug 37 includes at said end a "T-shaped" passageway 39 which connects the pipe 32 to a chamber 40 which, in turn, is connected to the pipe 33 in the horizontal portion. Valve plugs with varying sizes of passageways 39 can be inserted in the assembly according to how much solder it is desired to transport to the auxiliary pot.

In operation, the solder pump 11 will continuously pump a portion of the solder in the main solder pot 10 into the hose 25 connected to the pipe 32 of the valve assembly 12. The solder will be forced through pipe 32, passageway 39, chamber 40, pipe 33 and out one end 41 of pipe 33. Since the end 41 is positioned above the auxiliary solder pot 13, the solder will be deposited therein. Then, as illustrated by the arrows of FIG. 1, the solder will circulate around the auxiliary pot 13 by gravity feed. As the solder circulates, it will travel first under weir 14, then over weir 15, then under weir 16 through opening 27, and back over weir 15 and under weir 14. The solder will then pass through weir 17 and overflow into the main solder pot 10.

The solder in the auxiliary solder pot 13 is heated to a lesser temperature than the solder in the main solder pot 10 so that the solder will remain molten, but dissolved contaminants will precipitate out of the solder while circulating in the auxiliary pot. For example, the solder in the main pot 10 is typically heated to 240 degrees C., while the solder in the auxiliary pot is typically maintained at approximately 194 degrees C. The maximum allowable copper contamination level is 0.3 percent. The solubility of copper in solder at 194 degrees C. is approximately 0.2 percent. Thus, as the solder circulates in the auxiliary pot, copper precipitates in the form of a copper-tin dendrite which is easily removed from the auxiliary pot with a metal strainer, 26, dipped into the auxiliary pot. The strainer typically has 0.2–0.35 cm diameter perforations. The solder which returns to the main pot will have a concentration of copper which is approximately 0.2 percent, well below the allowable level. Desirably, the copper in the auxiliary pot will have a copper concentration of less than 0.22 percent as it returns to the main pot so that the copper concentration in the main pot will be maintained at less than 0.275 percent.

In addition to providing the function of transferring the solder from the main pot to the auxiliary pot, the skimmer valve 12 also keeps the solder molten during the transfer process. This is accomplished by the oil 36 which is inside the assembly. Specifically, the oil will transfer heat from the main pot to the areas surrounding pipes 32 and 33 in order to keep the solder in the pipes above the solder solidifying temperature, which is typically 190 degrees C.

It will be noted that the solder is pumped out by a pump 11 in the main pot 10 and the solder is circulated in the auxiliary pot 13 by a gravity feed due to the fact that the solder in the auxiliary pot overflows into the main pot 10 (see FIG. 1). Thus, the level of solder in the auxiliary pot 13 will be independent of the level of solder in the main pot 10 and will continue to circulate solder even when the solder level drops in the main pot. Further, only a single pump, already used in the HASL process, is required. Also, no pipe connections below the level of solder in the main pot are required.

The auxiliary pot 13 can also be isolated from the HASL process in pot 10 by placing a cap on pipe 41 or replacing valve plug 37 with a plug having no passageway 39.

Various modifications of the invention will become apparent to those skilled in the art. All such variations which basically rely on the teachings through which the invention has advanced the an are properly considered within the scope of the invention.

I claim:

1. A method for continuous removal of contaminants from molten solder in a main solder pot comprising the steps of:
    pumping the solder to a valve assembly which directs the solder into an auxiliary solder pot;
    heating the valve assembly to keep the solder in a molten condition;
    circulating the solder in the auxiliary pot by a gravity feed while heating the solder in the auxiliary pot to a lesser temperature than solder in the main pot so as to cause at least a portion of the contaminants to precipitate out of the solder while in the auxiliary pot; and
    returning the solder to the main pot after said portion of contaminants is removed therefrom.

2. The method according to claim 1 wherein the solder comprises lead and tin.

3. The method according to claim 1 wherein the valve assembly is heated by including therein a material which transmits heat from the main pot to the valve assembly.

4. The method according to claim 1 wherein solder in the main solder pot is heated to a temperature in the range 240–265 degrees C. and solder in the auxiliary pot is heated to a temperature in the range 192–198 degrees C.

5. The method according to claim 1 further comprising removing the precipitated contaminants from the auxiliary solder pot by means of a strainer.

6. The method according to claim 1 wherein the solder is returned to the main solder pot by overflowing the solder in the auxiliary solder pot into the main solder pot.

7. The method according to claim 1 wherein the contaminants comprise copper.

8. The method according to claim 7 wherein the percentage of copper in the solder in the auxiliary pot is reduced to less than 0.22 and the percentage of copper in the main pot is maintained at less than 0.275.

9. Apparatus for continuous removal of contaminants from molten solder located in a main solder pot comprising:

an auxiliary solder pot for receiving the solder from the main solder pot, said auxiliary solder pot including means for heating the solder at a lower temperature than solder in the main solder pot so as to precipitate at least a portion of the contaminants, and means for circulating and returning the solder to the main solder pot by gravity feed; and a valve assembly for receiving the solder from the main solder pot and directing it into the auxiliary solder pot, the valve assembly including means for heating the solder as it passes through the assembly.

10. Apparatus according to claim 9 wherein the means for circulating and returning includes a plurality of weirs in the auxiliary solder pot which cause the solder to move in vertical directions, and a weir at an end of the auxiliary solder pot adjacent the main solder pot which permits the solder to overflow the auxiliary solder pot into the main solder pot.

11. Apparatus according to claim 9 further comprising a pump in the main solder pot for pumping solder into the valve assembly.

12. Apparatus according to claim 9 wherein the means for heating solder in the auxiliary solder pot comprises low wattage electric heaters.

13. Apparatus according to claim 9 wherein the valve assembly includes a first pipe for receiving at one end the solder from the main solder pot, a valve mounted at the opposite end of the first pipe so as to control the flow of solder into a chamber adjacent to said opposite end, and a second pipe with one end adjacent to the chamber for receiving the solder and an opposite end for discharging the solder into the auxiliary solder pot.

14. Apparatus according to claim 9 wherein the means for heating comprises a heat transfer material surrounding passageways in the valve assembly through which the solder flows.

15. Apparatus according to claim 14 wherein the heat transfer material comprises an oil.

* * * * *